US005856263A

United States Patent [19]
Bhasin et al.

[11] Patent Number: 5,856,263
[45] Date of Patent: *Jan. 5, 1999

[54] CATALYSTS COMPRISING SUBSTANTIALLY PURE ALPHA-ALUMINA CARRIER FOR TREATING EXHAUST GASES

[75] Inventors: Madan Mohan Bhasin, Charleston; Michael Scott Jarrell, South Charleston, both of W. Va.

[73] Assignee: Union Carbide Chemicals & Plastics Technology Corporation, Danbury, Conn.

[*] Notice: This patent issued on a continued prosecution application filed under 37 CFR 1.53(d), and is subject to the twenty year patent term provisions of 35 U.S.C. 154(a)(2).

[21] Appl. No.: 784,726

[22] Filed: Jan. 16, 1997

Related U.S. Application Data

[63] Continuation of Ser. No. 397,741, Mar. 2, 1995, abandoned, which is a continuation-in-part of Ser. No. 159,958, Dec. 1, 1993, abandoned, which is a continuation of Ser. No. 937,533, Aug. 8, 1992, abandoned.

[51] Int. Cl.$^6$ .............................. B01J 23/44; B01J 23/00
[52] U.S. Cl. .......................... 502/333; 502/302; 502/303; 502/304; 502/313; 502/320; 502/334; 423/213.5
[58] Field of Search ............................................. 502/320

[56] References Cited

U.S. PATENT DOCUMENTS

| | | | |
|---|---|---|---|
| 4,012,485 | 3/1977 | Meguerian et al. | 423/213.5 |
| 4,038,175 | 7/1977 | Bhasin | 208/144 |
| 4,061,596 | 12/1977 | Matsushita et al. | 252/463 |
| 4,102,813 | 7/1978 | Kimura et al. | 252/430 |
| 4,306,909 | 12/1981 | Oda et al. | 501/112 |
| 4,307,198 | 12/1981 | Oda et al. | 501/119 |
| 4,335,023 | 6/1982 | Dettling et al. | 252/466 PT |
| 4,431,574 | 2/1984 | Bournonville et al. | 502/334 X |
| 4,524,051 | 6/1985 | Wright et al. | 423/247 |
| 4,722,920 | 2/1988 | Kimura et al. | 502/439 |
| 4,762,956 | 8/1988 | Lui et al. | 585/259 |
| 4,808,394 | 2/1989 | Kolts et al. | 423/437 |
| 4,855,265 | 8/1989 | Day et al. | 501/128 |
| 4,992,405 | 2/1991 | Chattha et al. | 502/303 |
| 5,021,389 | 6/1991 | Chattha et al. | 502/303 |
| 5,124,302 | 6/1992 | Lachman et al. | 502/213 |
| 5,139,994 | 8/1992 | Chattha et al. | 502/334 |
| 5,266,548 | 11/1993 | Koradia et al. | 502/439 |

FOREIGN PATENT DOCUMENTS

| | | |
|---|---|---|
| 0430437 | 5/1991 | European Pat. Off. . |
| 77100388 | 8/1977 | Japan . |
| 80142532 | 11/1980 | Japan . |
| 9226544 | 1/1992 | Japan . |
| 9392137 | 4/1993 | Japan . |

OTHER PUBLICATIONS

Gandhi et al., Catalysis Under Transient Conditions, ACS Symposium Series, 178 *The Use of Molybdenum in Automotive Three–Way Catalysts*, pp. 143–162 (1982).

Muraki et al., Applied Catalysis, *Effect of Lanthanum on the NO Reduction Over Palladium Catalysts*, 22(1986) 325–335.

Muraki et al., Ind. Eng. Chem. Prod. Res. Dev., *Behavior of Automotive Noble Metal Catalysts in Cycled Feedstreams*, (1985) 24, 43–49.

Muraki et al., Ind. Eng. Chem. Prod. Res. Dev., *Palladium–Lanthanum Catalysts For Automotive Emission Control*, vol. 25, No. 2, 1986, pp. 202–208.

Muraki et al., Ind. Eng. Chem. Prod. Res. Dev., Reduction of NO by CO Over Alumina–Supported Palladium Catalyst, (1986), 25, 419–424.

Muraki et al., Ind. Eng. Chem. Prod. Res. Dev., NO Reduction by CO Over Noble–Metal Catalysts Under Cycled Feedstreams, (1986), 25, 414–419.

Kummer, *Heterogeneous Gas Phase Catalysis and Pollution Control*, XI Meeting of The North American Catalysis Society, Detroit, MI, Apr. 1989.

*Primary Examiner*—Glenn Caldarola
*Assistant Examiner*—In Suk Bullock
*Attorney, Agent, or Firm*—S. H. Hegedus

[57] ABSTRACT

This invention is directed to an improved exhaust gas catalyst for the combustion of gaseous waste products from internal combustion engines, particularly automobiles, and industrial stationary source engines along with a method of making the same. The exhaust gas catalyst comprises a substantially pure alpha-alumina carrier and at least one noble metal selected from platinum, palladium and mixtures thereof, and has excellent stability over long-term use.

16 Claims, No Drawings

CATALYSTS COMPRISING SUBSTANTIALLY PURE ALPHA-ALUMINA CARRIER FOR TREATING EXHAUST GASES

RELATED APPLICATIONS

This application is a Continuation of prior U.S. application Ser. No. 08/397,741 filed Mar. 2, 1995, which is a continuation-in-part of application Ser. No. 08/159,958, filed Dec. 1, 1993, which is a continuation of application Ser. No. 07/937,533, filed Aug. 8, 1992, all now abandoned.

FIELD OF THE INVENTION

This invention pertains to catalysts for the treatment of gaseous waste products comprising carbon monoxide, hydrocarbons and oxides of nitrogen ($NO_x$) from the combustion or incomplete combustion of hydrocarbonaceous fuels. More particularly, this invention is directed to catalysts for treating exhaust gases from internal combustion engines and stationary sources employed in various applications so as to convert the exhaust gases into relatively innocuous materials such as $CO_2$, $H_2O$ and $N_2$.

BACKGROUND OF THE INVENTION

Gaseous waste products from the combustion of fuels pose serious health and environmental problems. Exhaust gases from hydrocarbonaceous fuel-burning sources such as stationary engines, industrial furnaces, industrial processes, etc., contribute significantly to air pollution, and the exhaust gases of automobile internal combustion engines have been recognized as a principal source of air pollution. In recent years there has been increasing interest, in view of the large number of automobiles traveling our roads, particularly in urban areas, in controlling the amount of gaseous waste products from automobile exhaust.

Automotive catalytic converters containing exhaust gas catalysts have more or less enabled automobiles to meet current standards established by government agencies to convert a substantial portion of hydrocarbons and carbon monoxide to water and carbon dioxide and the $NO_x$ gases to nitrogen and oxygen and/or water. A wide variety of metals and metal oxides, either alone or in combination, supported on various substrates have been utilized. In recent years, most exhaust gas catalysts have employed a combination of noble metals, particularly platinum, rhodium, and/or palladium, as the active materials of the catalyst. Often, the activity of the noble metals is enhanced by the addition of small amounts of other metals which act as promoters.

Typically, exhaust gas catalysts comprise a relatively low porosity ceramic support with a transition alumina coating having a high surface area. The underlying ceramic support is generally prepared by sintering a mold of clay or other ceramic material at a high temperature to impart density and strength. This, however, generally results in a support having a very low surface area. Consequently the ceramic support must be coated with another material having a higher surface area to contain the noble metals. The procedure of depositing a high surface area "washcoat," as such coating is generally known, onto a low surface area ceramic support is disclosed in, for example, U.S. Pat. Nos. 2,742,437 and 3,824,196. The ceramic supports may be provided in any shape, but typically they are in the form of pellets or a honeycomb-type shape commonly known as a monolith.

Gamma-alumina is often used as the washcoat in such exhaust gas catalysts. Although a gamma-alumina washcoat imparts a relatively high surface area to an exhaust gas catalyst, it results in number of undesirable effects. Often the washcoat does not adhere well to the underlying ceramic support under severe thermal stress, or has a level of thermal expansion incompatible with the ceramic support. In addition, gamma-alumina or other transition-alumina washcoats are thermodynamically unstable alumina phases. Eventually this unstable phase transforms to a thermodynamically stable alpha-alumina phase; however, in the process of transforming, the alumina loses surface area and traps noble metals, particularly rhodium, and may change their oxidation state, rendering the noble metals less effective or ineffective. Accordingly, the in situ conversion of an impregnated gamma-alumina carrier to the alpha form does not result in a catalyst of this invention.

Use of relatively large amounts of precious noble metals is a further drawback of conventional washcoated exhaust gas catalysts. This, coupled with the problem of entrapment of the noble metals under thermal stress, makes reclamation of the noble metals from these catalysts difficult. Costly, uneconomical reclamation techniques typically are required that, at best, are able to reclaim only a portion of the noble metals from used catalysts. Only about 5% of the total automobile exhaust gas catalysts employed worldwide are subjected to reclamation. The percentage of noble metals recovered from these catalysts is typically in the range of 60–80% for palladium and platinum and 50–60% for rhodium. As a consequence, the prices of noble metals have risen to very high levels in the last decade.

Conventional washcoated exhaust gas catalysts also require a time-consuming, tedious, cost-ineffective, multi-step preparation procedure. This procedure includes preparation of the support, preparation of the washcoat itself, including impregnation of all the catalytic and promoter components individually or collectively into the washcoat, and application of the washcoat onto the support.

Although washcoated exhaust gas catalysts have acceptable initial light-off temperatures, with age their light-off temperatures often increase, sometimes rapidly. Light-off temperature ("$T_{50}$") is the temperature at which an exhaust gas catalyst begins to convert 50 percent of the waste products of the exhaust gas into carbon dioxide, water, nitrogen and oxygen. Thus, when an automobile is initially started and for the time until the catalyst reaches its light-off temperature, most of the exhaust gases are not catalytically treated but are simply emitted into the atmosphere.

Stable catalytic activity is becoming a critical requirement with automotive exhaust gas catalysts. Conventional washcoated exhaust gas catalysts lose approximately half of their activity relatively rapidly, i.e., during the first 12,000 miles of use. Often washcoated exhaust gas catalysts actually physically deteriorate. For example, when exposed to thermal shock or high thermal transients, washcoated catalysts can suffer melt-down of the support in the worst case, or sintering, spalling, or rapid deactivation due to the reaction of the catalytic metals with the support or washcoat. New government standards for catalytic converters containing exhaust gas catalysts have much stricter longevity requirements, in that such catalytic converters must perform efficiently for much longer periods of time, i.e., 50,000–100,000 miles of use.

SUMMARY OF THE INVENTION

The exhaust gas catalysts of the present invention are unqiue in several respects, Firstly, they do not employ a washcoat. Rather, a porous, substantially pure alpha-alumina carrier is utilized in which noble metals are directly impregnated. Secondly, the alpha-alumina of these catalysts is a low surface area material, which contravenes standard thinking in this area of catalysis. Without intending to be bound by any theory, it is believed that an unexpectedly high degree of fluid mixing occurs in the relatively large pores of the alpha-alumina, thereby providing chemical performance previously associated only with high surface area materials such as gamma-alumina. Thirdly, these exhaust gas catalysts often advantageously utilize less noble metals than do conventional catalysts and yet are able to attain overall catalytic activity which is typically better than known catalysts. Fourthly, the catalysts of the invention also facilitate reclamation of the noble metals in a simple and cost effective manner, such that essentially all of the noble metals may be recovered and recycled for further use.

Importantly, while the exhaust gas catalysts exhibit initial light-off temperatures comparable to those of conventional washcoated catalysts, these catalysts are more stable over time than washcoated catalysts, and have excellent high temperature strength and have desirably high thermal shock strength (in spite of the higher thermal expansion properties of alpha-alumina relative to ceramics used as carriers in conventional washcoated catalysts). Hence, improved light-off performance can be obtained when the exhaust gas catalyst is placed closer to the exhaust gas source without sacrificing long-term performance of the exhaust gas catalyst.

In particular, the exhaust gas catalyst of the invention may be prepared by the following method, which comprises:

(a) impregnating an alpha-alumina carrier with a noble metal selected from the group consisting of platinum, palladium, and mixtures thereof by contacting the carrier with a solution containing a solvent and a compound of the noble metal;

(b) drying the impregnated carrier preferably at a rate of less than about 1 gram of solvent per gram of carrier per hour until at least about 90 percent of the solvent is removed from the carrier; and (c) heating the dried carrier.

The carrier is highly pure alpha-alumina, i.e., alpha-alumina preferably containing less than about 5% by weight impurities. The extremely low concentration of impurities in the carrier contributes to stable catalytic performance at the high temperatures encountered in, for example, automotive catalytic converters operating under routine, and especially under transient, conditions such as engine misfiring.

DETAILED DESCRIPTION OF THE INVENTION

The exhaust gas catalyst is used for the reduction of nitrogen oxide gases and oxidation of carbon monoxide and hydrocarbons contained in, for example, the exhaust gases from internal combustion engines or stationary industrial exhaust sources. The exhaust gas catalyst comprises a porous, substantially pure alpha-alumina carrier, and an effective amount of a noble metal selected from the group consisting of a platinum, palladium and combinations thereof impregnated in the carrier. Preferably, the amount of noble metal in the exhaust gas catalyst is about 0.01 percent to about 2.0 percent by weight based on the total weight of the catalyst. The exhaust gas catalyst may also be impregnated with rhodium. The exhaust gas catalyst is also optionally impregnated with one or more oxygen promoters.

The carrier may be of various shapes; however, monoliths are preferred, particularly for automotive catalytic converter applications. Monolith carriers for automotive catalytic converters may be cylindrical, spherical, square, oval, racetrack or ellipsoidal-shaped, depending on the desired end use. For exhaust gas catalysts used in treating stationary industrial exhaust sources, pill-shaped carriers may be used and packed into an appropriate catalyst housing. A prime consideration in selecting the shape of a carrier is its ability to be used in the catalyst housing for which it is intended.

With a carrier having obligatory gas channels, e.g., a monolithic structure, wherein the exhaust gas is directed to pass through the obligatory gas channels rather than around the carrier, it is generally preferred to employ a plurality of obligatory gas channels to both minimize pressure drop and maximize available surface area for diffusion into and from the pores of the carrier. Hence, in most instances at least about 25, preferably 40 percent, more preferably 60–70 percent of the open frontal area of such a carrier comprises obligatory gas channels.

Often, the open cell density of the exhaust gas catalyst is about 100 to 400 cells per square inch ("cpi"), preferably about 200 to 400 cpi. The higher the open frontal area of the exhaust gas catalyst, the lower the pressure drop of the exhaust gas catalyst. However, high geometric surface area in the exhaust gas catalyst is desirable to maximize contact of the gaseous waste products with the exhaust gas catalyst. Hence, a higher open cell density in combination with relatively thin walls is desirable. It is often desired to maintain the minimum cross-sectional dimension of each of the obligatory gas channels above about 1.0, preferably above about 1.5, millimeters. Usually, wall thicknesses between such obligatory gas channels are below about 5 millimeters and advantageous results can be obtained using wall thicknesses of less than about 3 millimeters, such as 0.2, 0.4 or 1 millimeter.

The cross-sectional shape of the obligatory gas channels may be any convenient shape. Usually, square, circular, triangular, or hexagonal patterns are used. Uniform spacing of the obligatory gas channels is generally preferred such that the flow, heat generation and dimensional stability are enhanced. The paths of the obligatory gas channels may be straight, curved, or tortuous as in a sponge structure. Straight obligatory gas channels are preferred for use in exhaust gas catalysts for treating exhaust gas that does not contain particulate matter. For treating exhaust gas containing particulate matter, such as from diesel engines, curved or tortuous obligatory gas channels are preferred in order to trap the particulate matter without significantly reducing gas phase conversions or increasing pressure drop.

The size of the carrier is usually dependent on the size of the catalyst housing in which it is intended to function. Undue amounts of exhaust gas should be prevented from circumventing the obligatory gas channels. Thus, for an automobile exhaust gas catalyst the carrier is, for example, cylindrical with a diameter approximating the inside diameter of a typical automobile catalytic converter housing, e.g., about 10 to 20 centimeters. The length of such a carrier can vary widely, and for automobile exhaust gas catalysts is preferably less than the length of a typical commercial automobile catalytic converter housing, e.g., about 10 to 30 centimeters.

The porous, substantially pure alpha-alumina carrier preferably has the following characteristics. The porosity of the carrier is preferably about 0.2 cubic centimeter per gram to about 0.6 cubic centimeter per gram, and preferably about 0.3 to 0.4 cubic centimeter per gram, of carrier; the surface area is about 0.2 square meter per gram to about 10 square meters per gram of alpha-alumina carrier, preferably, about 0.3 square meter per gram to about 4 square meters per gram, and more preferably about 0.7 to about 1.5 square meters per gram; and the average pore size of the pores in the carrier is about 0.1 micron to about 100 microns, a major proportion of the pores having a size in the range of about 0.1 micron to about 10 microns, the preferred average pore size being about 0.2 micron to about 5 microns. It is particularly noteworthy that the catalysts of this invention achieve their improved results utilizing low surface area alpha-alumina, as opposed to the high surface area transitional aluminas of the prior art. For example, gamma-alumina typically has a surface area of about 200 to about 300 square meters per gram, a pore volume of about 0.6 to about 1.2 cubic centimeters per gram, and a mean pore diameter of about 50 to about 100 angstroms. The porous, alpha-alumina carrier has a very high purity, i.e., at least about 95 weight percent alpha-alumina, preferably at least about 98 weight percent alpha-alumina. Impurities, particularly silicates and aluminosilicates of alkali and alkaline earth metal oxides, are extremely detrimental to the exhaust gas catalyst. Such impurities preferably comprise no more than about 2 percent, more preferably no more than about 1 percent, of the carrier.

By "substantially pure alpha-alumina" is meant alpha-alumina the surface area, porosity, and thermal stability of which have not been altered from their normal values to such an extent that the performance of the alpha-alumina in a catalyst of this invention is significantly degraded. (By the terms "thermal stability" or "thermally stable" is meant that there is no significant degradation of the catalytic performance of the alpha-alumina with thermal aging at temperatures of about 500° C. or greater.) Accordingly, "substantially pure alpha-alumina" is intended to include additional materials incorporated into the composition for functional reasons which do not materially degrade the catalytic performance of the alpha-alumina. Such functional materials might include, for instance, art-known extrusion aids, binders, thermal stability enhancers, and the like, which are added for functional manufacturing or performance purposes unrelated to the deposition of the catalytic materials in the macropores of the alpha-alumina. As thermal stability enhancers, there may be mentioned oxides of titanium and composite oxides of titanium and aluminum, optionally including oxides of barium, zirconium, lanthanum, cerium, manganese or other materials such as phosphates, and the like. For further information on the preparation of such materials, reference may be had to Jap. Kokai Nos. 93-92137; 92-26544; 80-142532; 77-100388; inter alia. Among U.S. patents relating to titanate-bearing compositions are U.S. Pat. Nos. 4,061,696; 5,124,302; 4,307,198; 4,855,265; 4,306,909; inter alia.

Frequently, the average side and end-on crush strength of the exhaust gas catalyst of the invention is at least about 10, preferably about 20, pounds. More preferably, the average side and end-on crush strength of the exhaust gas catalyst is in the range of 50 to 100 pounds or more. The crush strength of a catalyst is based not only on the intrinsic strength of the material of construction but also the geometric shape of the catalyst. Thus, with thinner walled structures, smaller carrier sizes and carrier partitions enhance the strength of the catalyst.

The attrition loss of pill-shaped carrier is preferably less than about 25 percent per hour, and more preferably, less than about 15 percent per hour.

The preferred monolithic form of the carrier is produced from alpha-alumina, for example, by an extrusion molding method, or a method comprising folding a corrugated paper sheet saturated with wet carrier starting material into a bundle. The extruded or wet-formed carrier is dried carefully to maintain the monolith shape and structure and minimize gradients of water vapor between the monolith and the surrounding atmosphere. The dried monolith is calcined at a temperature of up to about 1200° to 1600° C. to remove combustible organics and bind the alumina. Preferably the calcination temperature is from about 1300° to 1500° C. The time for calcination is often about 0.5 to 10 hours. If the starting alumina is at least partially in a transitional phase, e.g., gamma, care should be taken that the heat treatment is sufficient to result in substantially pure alpha-form, i.e., no more than about 5% residual transitional phases present.

The number of exposed noble metal atoms in the exhaust gas catalyst is preferably at least about 10 percent of the total noble metal atoms impregnated in the carrier. Often, 50 percent or more of the total noble metal atoms in the carrier are exposed on the surface of the carrier. This may be determined by standard chemisorption techniques or electron microscopy. The number of active catalyst sites on the exhaust gas catalyst available to the gaseous waste products is determined by the number of noble metal atoms exposed on the surface of the carrier. The larger the size of noble metal aggregates on the surface of the carrier, the smaller the number of metal atoms exposed on the surface of the carrier. Without wishing to be bound by theory, it is believed that higher percentages of exposed noble metal atoms (i.e., small metal aggregate sizes) favor combustion of ethylene and other unsaturated hydrocarbons. However, a certain fraction of the noble metal aggregates should be large enough to combust saturated hydrocarbons as well, since large noble metal aggregates are known to be better for combustion of saturated hydrocarbons.

Palladium and platinum may be used in the exhaust gas catalyst singly or in combination. The amount of palladium in the exhaust gas catalyst is preferably about 0.01 to about 1.0 percent by weight based on the total weight of the exhaust gas catalyst, more preferably about 0.02 to about 0.2 percent by weight of the exhaust gas catalyst. The amount of platinum in the exhaust gas catalyst is preferably about 0.01 to about 1.0 percent by weight based on the total weight of the exhaust gas catalyst, more preferably about 0.02 to about 0.2 percent by weight of the exhaust gas catalyst. For relatively high-temperature (e.g., close-coupled) usage, it is often preferred to use palladium instead of platinum of combinations thereof. Often, combinations of platinum and palladium are preferred, with weight ratios of platinum to palladium preferably in the range of about 0.01:1 to about 100:1, more preferably in the range of about 0.1:1 to 10:1. The overall amount of noble metal in the exhaust gas catalyst is from about 0.01 to about 2 percent by weight of the exhaust gas catalyst. Often, very low amounts of noble metal, such as about 0.01 to about 0.03 percent by weight of the exhaust gas catalyst are used with advantageous results. Such amounts are less than half that typically used in conventional exhaust gas catalysts.

The exhaust gas catalyst may additionally contain rhodium. Rhodium particularly aids in the reduction of $NO_x$ gases to $N_2$ by reaction of the $NO_x$ gases with hydrocarbons and CO. The amount of rhodium in the exhaust gas catalyst also may be from about 0.01 to about 1.0 percent by weight, preferably about 0.02 to about 0.2 percent by weight, of the exhaust gas catalyst.

The exhaust gas catalyst, especially when used in automotive applications, may also contain one or more oxygen promoters for oxygen storage. Preferably, the amount of oxygen promoter contained in the exhaust gas catalyst is from about 0.1 to about 10 percent by weight of the exhaust gas catalyst. Oxygen promoters often comprise transition metals, such as cerium, molybdenum, vanadium, manganese, chromium, titanium, lanthanum, niobium, zirconium, rare earth metals and the like. Oxygen promoters store oxygen during the operation of automobile engines by chemisorbing oxygen, so that during periods of low air to fuel ratio ("A/F"), oxygen will be available in the exhaust gas catalyst for combustion of the gaseous waste products to take place.

The preferred process for producing the exhaust gas catalyst of the invention comprises the following steps:
 a) impregnating an alpha-alumina carrier with a metal selected from the group consisting of palladium, platinum and mixtures thereof, and optionally also oxygen storage promoter metals such as lanthanum, cerium, and the like, and mixtures thereof, by contacting the carrier with a solution containing a solvent and a compound of the metal or metals;
 b) drying the impregnated carrier, preferably at a rate of less than about 1 gram of solvent per gram of carrier per hour until at least about 90 percent of the solvent is removed, from the carrier; and
 c) heating the dried carrier at a temperature sufficient to decompose the salts.

It will be understood that the various metals may be applied singly or in mixtures. If not all applied together, the above process will be repeated for each impregnation.

The solvent is an impregnating vehicle for the noble metal and other desired additives for the exhaust gas catalyst, such as oxygen promoters. The solvent may be aqueous or organic. Preferably, the solvent is water, more preferably distilled water.

If an organic solvent is used, the organic solvent may be an unsubstituted or a substituted hydrocarbon, including aliphatic, cycloaliphatic and aromatic compounds such as ethers, alcohols, amines, and nitriles. The organic solvent is a liquid at process temperatures so that its boiling point ranges from just above room temperature, about 20° C. or 25° C., to less than the temperature selected for the heating step. The organic solvent is preferably non-polar or of low polarity. Examples of useful organic solvents are benzene, toluene, ethylbenzene, biphenyl, xylene, n-octane, isooctane, cyclopentane, cyclohexane, methylcyclohexene, tetrahydrofuran, diglyme, ethyl ether, and acetonitrile. The organic solvent should be inert to the materials used in the process, and capable of dissolving at least a portion of the compound of the noble metal.

The compound of the noble metal must be adequately soluble in the solvent, and therefore may contain various moieties depending on whether an aqueous or organic solvent is used. When an organic solvent is used, the compound of the noble metal preferably contains an organic moiety, such as acetylacetonate, carbonyl acetylacetonate, alkanoate, and the like. When an aqueous solvent is used, the compound of the noble metal may contain an inorganic moiety, such as a nitrate, a halogen, or sulfur-containing moiety. Preferably nitrate moieties, more preferably aminonitrate moieties, such as diaminodinitrates, tetraaminodinitrates, and the like, are used. Various inert residues may be present in the compound of the noble metal, provided they are nonreactive with all of the components of the process under the process conditions, are non-contaminating, and can be removed under the process conditions.

The amount of the compound of the noble metal in the solution depends on the amount of noble metal desired to be impregnated in the exhaust gas catalyst. Given the porosity of the carrier employed, one skilled in the art can readily calculate the required amount of compound of the noble metal in the solution. Typically about 0.001 g/ml of solution to about 0.03 g/ml of solution of compound of the noble metal is used.

The compound of the noble metal is dissolved in the solvent at a temperature in the range of about 20° C. to about 90° C., preferably 25° C. to 65° C., the heat increasing the solubility. The temperature of the solution is maintained during impregnation at about 20° C. to 90° C., preferably 25° C. to 65° C., to maintain the level of solubility. With aqueous solvents, often ambient temperatures may be utilized during impregnation.

Contacting of the carrier and the solution may take place at atmospheric pressure or under vacuum either by adding the solution to the carrier or dipping the carrier in the solution. Where the solution is added to the carrier, some kind of agitation such as stirring is advantageous as an aid to impregnation. Impregnation and the subsequent drying and heating steps may be done, for example, in a simple heat-resistant glass flask, a stainless steel vessel, or a glass-lined stainless steel vessel.

If a combination of noble metals is desired on the exhaust gas catalyst, the noble metals may be impregnated onto the exhaust gas catalyst simultaneously or sequentially. Preferably, the exhaust gas catalyst is impregnated sequentially. In the case of simultaneous impregnation, all of the desired compounds of noble metals are contained in the same solution, which is contacted with the carrier to impregnate the noble metals at the same time. The impregnated carrier is then dried and heated. In the case of sequential impregnation, the compounds of noble metals are present in different solutions. After contacting with each solution, the carrier is dried and heated to deposit the noble metals in sequence. With sequential impregnation, each solution may contain only one compound of a noble metal or combinations of compounds of noble metals. In both simultaneous and sequential impregnation, the various noble metals may be contained in compounds having the same organic or inorganic moieties or different organic or inorganic moieties as long as the solubility of the compounds is sufficient under impregnating conditions.

Rhodium may also be impregnated into the carrier either before, with, or after the noble metal or metals. That is, the rhodium may be impregnated simultaneously or sequentially with the noble metal or metals. Rhodium is impregnated into the carrier in the same manner as the noble metal, i.e., by contacting the carrier with a solution containing dissolved rhodium compound, followed by drying and heating. Often the same solvent is used for impregnating the noble metal and rhodium, however, this is not obligatory. The rhodium compounds suitable for impregnating rhodium in the carrier may contain either organic or inorganic moieties. As with the compound of the noble metal, the type of rhodium compound depends of the type of solution used to impregnate the rhodium. Rhodium compounds containing organic moieties such as acetylacetonate, carbonyl acetylacetonate, alkonate and the like are preferred when using organic solutions. Rhodium compounds containing inorganic moieties, such as halogens, sulfur-containing moieties and nitrates, preferably nitrates such as aminonitrates including diaminodinitrates, tetraminodinitrates and the like, are preferred when using aqueous solutions.

One or more oxygen promoters may also be impregnated into the carrier either before, together with, or after the noble metal. Preferably, the carrier is impregnated with the oxygen promoters before the noble metal. The oxygen promoters are also impregnated into the carrier in the same manner as the noble metal, i.e., by contacting the carrier with a solution containing dissolved oxygen promoter compounds, followed by drying and heating. Often the same solvent is used for impregnating the noble metal and the oxygen promoters, however, this is not obligatory. The oxygen promoters may be impregnated simultaneously or sequentially with the noble metal. When the oxygen promoters are transition metals, the oxygen promoter compounds are preferably transition metal nitrates, chlorides, acetates, tartarates, citrates, oxides, carbonates, or complexes thereof.

Drying is conducted under a drying atmosphere, such that evaporation of the solvent from the entire carrier body takes place slowly and evenly. This aids in the even dispersion of the material being impregnated in the carrier. Preferably, drying is performed such that no more than about 1 gram of solvent per gram of dried carrier is removed from the carrier per hour. More preferably, the drying rate is about 0.01 to 0.50 gram of solvent per gram of carrier per hour, most preferably about 0.02 to 0.08 grams of solvent per gram of carrier per hour. This is often accomplished by gradually decreasing the vapor pressure of the solvent in the drying atmosphere from its saturation value (i.e., saturation vapor pressure--the maximum amount of solvent the drying atmosphere can hold at a given temperature and pressure) to about 20 to 90 percent of the saturation value as the solvent is slowly removed from the carrier. The vapor pressure of solvent in the drying atmosphere may be maintained near its saturation value (i.e., around 90% of the saturation vapor pressure) for very slow drying, or may be maintained at a lower level (i.e., around 20–40% of the saturation vapor pressure) for faster drying. If desired, the vapor pressure of solvent in the drying atmosphere may be initially held at a relatively high level for the bulk of drying and then decreased to about 20–50% of the saturation vapor pressure for final drying. It is preferred that slow drying be employed, to minimize problems of "wicking," i.e., the tendency of the drying salts to migrate out of the relatively large pores of the alpha-alumina up toward the surface of the carrier. (This is much less of a problem with high surface area materials such as gamma-alumina.)

The drying temperature is often up to about 100° C. and can range up to about 150° C. Preferably, the selected temperature is maintained during drying, so that drying proceeds at an even rate. After incipient wetness of the carrier has been reached, drying should be sufficient to remove at least about 90% of the solvent from the carrier in a desired time span, which may be about 5 minutes to 20 hours or more. At room temperature, drying can be accomplished by a strong air flow, which may not be necessary at higher temperatures.

Heating is accomplished at temperatures in the range of about 100° C. to about 1,200° C., preferably about 500° to about 1,000° C. Heating should be performed at a suitable temperature to achieve compositional uniformity throughout the impregnated carrier. The time for heating is sufficient to remove substantially all of the remaining solvent and residues of the compound of the noble metal (and oxygen promoter compound and rhodium compound, if used) from the carrier. The removal of such residues can be determined by conventional analytical techniques. Heating may run from about 1 minute to about 20 hours. Time periods are best determined by experience and are most accurately set after analysis for residual materials. A rough determination as to decomposition and removal of the solvent and residues may be made by visual observation. The compound of the noble metal gives a yellowish to brownish color to the carrier, while the noble metal itself gives a light grey to dark grey or beige to brown color to the carrier.

When an aqueous solvent is used, heating may be performed under a variety of atmospheres. However, if an organic solvent is used, an inert atmosphere, preferably free of oxygen, such as nitrogen, argon, or krypton, may be used during heating. The heating apparatus should be purged with either an inert gas or reducing gases before the dried carrier is placed therein.

It should be noted that drying and heating may be done separately or together as a single step. If done at the same time, temperatures of about 100° C. to about 900° C. are used.

The recovered solvent may be recycled and reused for further impregnations.

Without wishing to be bound by theory, it is believed that the structure of the highly pure alpha-alumina carrier, i.e., the specific combination of pore size, porosity and surface area, facilitates reclamation of substantially all of the noble metal contained in the exhaust gas catalyst. Thus, as a result of subjecting the exhaust gas catalyst to a reclamation process, upwards of 95% of the noble metal is recovered.

Reclamation of the noble metal may be accomplished by contacting used exhaust gas catalyst with water containing about 10–30 percent by volume nitric acid, and/or 10–30 percent by volume hydrochloric acid and/or 10–30 percent by volume sulfuric acid. Preferably, the amount of hydrochloric acid and/or sulfuric acid used is equal to the amount of nitric acid used. The mixture is then boiled, preferably for at least about 5 minutes, more preferably for about an hour, and filtered. Optionally, the exhaust gas catalyst may be ground before contacting with the water/acid solution. Often, at least about 90 to 95 percent of the noble metal contained in the exhaust gas catalyst may be recovered in the filtrate by such procedure. Only very small amounts of aluminum and other impurities are leached from the exhaust gas catalyst, thus simplifying the recovery of the noble metal. With conventional catalysts, large amounts (1–2 orders of magnitude greater) of aluminum, alkali metals, alkaline earth metals, and other impurities are removed with the noble metal, making recovery of the noble metal difficult and expensive.

The following examples are offered solely for the purpose of illustrating specific embodiments of the invention and, in particular, its utilization in the conversion of gaseous waste products from automotive internal combustion engines. Such examples are not intended to limit the scope of the invention.

In these examples, the "Effective Support Area" is the surface area of the support as measured by the conventional B.E.T. method described by S. Brunauer, et al., in *J. Am. Chem. Soc.*, 60: 309–16 (1938). The "pore volume" or "porosity" is determined by either conventional mercury porosity or water absorption techniques and, unless otherwise specified, the water absorbtion technique is used. "Pore diameters and distributions" are obtained by the method of measurement described in C. Orr, Jr., "Application of Mercury Penetration to Materials Analysis", *Powder Technology*, 3: 117–123 (1970).

EXAMPLE 1

A series of exhaust gas catalysts was prepared according to the invention and compared with an exhaust gas catalyst sample from a commercially available Chevrolet catalytic converter, a cordierite exhaust gas catalyst and a washcoated cordierite exhaust gas catalyst. The light-off temperatures ("$T_{50}$") of each exhaust gas catalyst for combusting ethane, ethylene and methane were measured as a function of time.

All of the exhaust gas catalysts were approximately 22 to 24 mm in diameter and approximately 30 mm long. A ⅜-inch hole was drilled into the center of each exhaust gas catalyst to accommodate a thermocouple well.

Light-off temperatures were measured by placing the exhaust gas catalysts individually in 28 mm (i.d.) fused silica tubes. Several thermocouples were placed along the length of the exhaust gas catalysts and at the outlets of the tubes to record the temperature at several points along the tubes. The tubes were placed in vertically mounted split tube furnaces, which were heated in the range of 100° C. to 900° C. in 100° C. increments. A feedstream containing:
methane 500 ppm
ethane 500 ppm
ethylene 500 ppm
oxygen 1.0 mole %
steam 8 to 10 mole %
nitrogen balance
was fed to each tube at a flow rate such that the Gas Hourly Space Velocity (GHSV) of the feedstream was 40,000 per hour and the pressure was atmospheric.

For each catalyst, the temperatures at which 50% of the methane, ethane and ethylene were burned were measured using fresh catalyst and catalyst aged for certain numbers of hours. Such measurements were made by analyzing the composition of the product stream from each tube for methane, ethane and ethylene by gas chromatography using a 25 m Carbo PLOT® 007 megabore column (Chrompack International, BV) with the TCD and FID detectors connected in series. The results are given in Table I.

Comparative Catalyst 1 was the Chevrolet catalyst sample. It was cored from a commercially available Chevrolet catalytic converter monolith, and contained 0.064 wt % palladium, 0.068 wt % platinum and 0.014 wt % rhodium.

Comparative Catalyst 2 was the cordierite catalyst, which contained 0.125 wt % palladium and 0.062 wt % platinum. Catalyst 2 was prepared by dissolving 0.3524 g palladium acetylacetonate and 0.1232 g platinum acetylacetonate in 50 ml of toluene. A cordierite monolith, which was commercially available from Corning Glass Works and had an approximate composition of 42–56 wt % $SiO_2$, 30–45 wt % $Al_2O_3$ and 12–16 wt % MgO (See European Patent Application No. 91302857.7), was soaked in the toluene solution at 61° C. under vacuum for 30 minutes. The toluene solution was then drained off and the catalyst was dried at 65° C. under vacuum for 3.5 hours. Catalyst 2 was then fired on a belt roaster at 500° C. for 2.5 minutes.

Comparative Catalyst 3 was the washcoated cordierite catalyst, which contained 0.125 wt % palladium and 0.0625 wt % platinum. Comparative Catalyst 3 was prepared as follows. A cordierite monolith (commercially available from Corning Glass Works) washcoated with gamma alumina soaked in a toluene solution containing 0.8866 g palladium acetylacetonate and 0.3111 g platinum acetylacetonate in 100 ml of toluene at 65° C. for 30 minutes under vacuum. The toluene solution was drained off and the monolith was dried under vacuum at 61° C. for 4.5 hours. The dried catalyst was then fired in air on a belt roaster at 500° C. for 2.5 minutes.

Catalysts 4 through 14 were prepared according to the invention. Unless specified otherwise below, each of Catalysts 4 through 14 was made with 99.6% pure alpha-alumina monolith carriers. The 99.6 wt % pure alpha-alumina carriers contained oxides of alkali metals, alkaline earth metals, iron, titanium and silicon as impurities. The surface areas of the carriers were in the range of 0.8 to 1.1 m²/g, the pore volumes of the carriers were in the range of 0.30 to 0.40 cc/g and the median pore diameters were from 0.9 to 1.2 microns.

In addition, each of Catalysts 4 through 14 was dried under controlled humidity drying. That is, the catalysts were dried at 30° to 32° C. under a high flow of humid air (i.e., containing water). At the start of drying, the humidity of the air was approximately 96%. As drying proceeded, the relative humidity of the air was slowly lowered to 35% over eight hours. The humidity was then maintained at about 35% for an additional 2 to 6 hours. After controlled humidity drying, each of Catalysts 4 through 14 was calcined at 500° C. for one hour in air.

Catalyst 4 was impregnated using an aqueous solution containing 1.3 g of tetraamine palladium dinitrate and 0.95 g of tetraamine platinum dinitrate in 500 ml of water. A 99.6 wt % alpha-alumina monolith bonded with 5% VOLCLAY Western Bentonite clay was used. This Bentonite clay has a typical composition of 60–62 wt % $SiO_2$, 21–23 wt % $Al_2O_3$, 3–4 wt % $Fe_2O_3$, 0.1–0.7 wt % CaO, 2–3 wt % $Na_2O$, 0.4–0.5 wt % $K_2O$, 2–3 wt % MgO and 5–6 wt % chemically bound water. The monolith was first placed under a vacuum for six minutes, and then soaked in the aqueous solution for six minutes at 22° C. The monolith was then dried and calcined as described in the preceding paragraph. The target loadings of palladium and platinum on Catalyst 4 were 0.034 wt % and 0.034 wt %, respectively.

Catalyst 5 was impregnated using an aqueous solution containing 0.985 grams of tetraamine palladium dinitrate and 0.7 grams tetraamine platinum dinitrate in 400 ml of water. An alpha-alumina monolith containing 3.9 wt % sodium silicate bond obtained using 7.2% of Pittsburgh Quartz "C" brand silicate suspension (18 wt % $Na_2O$, 36 wt % $SiO_2$, remainder water) was first placed under a vacuum for six minutes, and then soaked in the aqueous solution for six minutes at 22° C. The monolith was then dried and calcined as described above. The target loadings of palladium and platinum on Catalyst 5 were 0.044 wt % and 0.044 wt %, respectively.

Catalyst 6 was impregnated using an aqueous solution containing 15.4 grams of tetraamine palladium dinitrate and 10.8 grams tetraamine platinum dinitrate in 1500 ml of water. An alpha-alumina monolith containing 0.29 wt % $SiO_2$ was first placed under a vacuum for six minutes, and then soaked in the aqueous solution for six minutes at 22° C. The monolith was then dried and calcined as described above. The target loadings of palladium and platinum on Catalyst 6 were 0.03 wt % and 0.03 wt %, respectively.

Catalyst 7 was impregnated using an aqueous solution containing 1.3 grams of tetraamine palladium dinitrate and 0.95 gram tetraamine platinum dinitrate in 500 ml of water. A 99.6 wt % alpha-alumina monolith was first placed under a vacuum for six minutes, and then soaked in the aqueous solution for six minutes at 22° C. The monolith was then dried and calcined as described above. The target loadings of palladium and platinum on Catalyst 7 were 0.036 wt % and 0.036 wt %, respectively.

Catalyst 8 was prepared using sequential impregnation as follows. An alpha-alumina monolith containing 1.31 wt % $SiO_2$ was placed under a vacuum for six minutes and then soaked in a first aqueous solution containing 10.8 g of tetraamine platinum dinitrate in 1500 ml of water for six minutes at room temperature. The monolith was removed from the first aqueous solution, dried under controlled humidity drying and then calcined at 500° C. for one hour. Next, the monolith was soaked in a second aqueous solution containing 15.42 g of tetraamine palladium dinitrate in 1500 ml of water for six minutes at room temperature. The monolith was then removed from the second aqueous solution, dried under controlled humidity drying and calcined again at 500° C. for one hour. The target values of palladium and platinum on Catalyst 8 were 0.136 wt %, and 0.135 wt %, respectively.

Catalyst 9 was prepared using coimpregnation as follows. An alpha-alumina monolith containing 1.31 wt % $SiO_2$ was placed under a vacuum for six minutes and then soaked in an aqueous solution containing 5.23 grams of tetraamine palladium dinitrate and 3.79 grams of tetraamine platinum dinitrate in 1000 ml of water for six minutes at room temperature. The monolith was then removed from the aqueous solution, dried under controlled humidity drying and calcined again at 500° C. for one hour. The target values of palladium and platinum on Catalyst 9 were 0.0748 wt % and 0.0748 wt %, respectively.

Catalyst 10 was prepared using co-impregnation as follows. A 99.6 wt % alpha-alumina monolith was placed under a vacuum for six minutes and then soaked in an aqueous solution containing 37.5 grams of lanthanum trinitrate, 74.3 grams of cerium trinitrate, 1.97 grams of tetraamine palladium dinitrate, 1.4 grams of tetraamine platinum dinitrate, and 0.18 grams of rhodium trinitrate in 400 ml of water for six minutes at room temperature. The monolith was then removed from the aqueous solution, dried under controlled humidity drying and calcined again at 500° C. for one hour. The target values of lanthanum, cerium, palladium, platinum, and rhodium on Catalyst 10 were 1.31 wt %, 2.62 wt %, 0.078 wt %, 0.077 wt %, and 0.019 wt %, respectively.

Catalyst 11 was prepared using sequential impregnation as follows. A 99.6 wt % alpha-alumina monolith was placed under a vacuum for six minutes and then soaked in a first aqueous solution containing 103.2 grams of lanthanum trinitrate and 204.3 grams of cerium trinitrate in 1100 ml of water for six minutes at room temperature. The monolith was removed from the first aqueous solution, dried under controlled humidity drying and then calcined at 500° C. for one hour. Next, the monolith was soaked in a second aqueous solution containing 1.97 grams of tetraamine palladium dinitrate, 1.4 grams of tetraamine platinum dinitrate and 0.18 gram of rhodium trinitrate in 400 ml of water for six minutes at room temperature. The monolith was then removed from the second aqueous solution, dried under controlled humidity drying and calcined again at 500° C. for one hour. The target values of lanthanum, cerium, palladium, platinum, and rhodium on Catalyst 11 were 1.4 wt %, 2.7 wt %, 0.073 wt %, 0.070 wt %, and 0.018 wt %, respectively.

Catalyst 12 was prepared using sequential impregnation as follows. A 99.6 wt % alpha-alumina monolith was placed under a vacuum for six minutes and then soaked in a first aqueous solution containing 37.5 grams of lanthanum trinitrate and 74.3 grams of cerium trinitrate in 400 ml of water for six minutes at room temperature. The monolith was removed from the first aqueous solution, dried under controlled humidity drying and then calcined at 500° C. for one hour. Next, the monolith was soaked in a second aqueous solution containing 1.97 grams of tetraamine palladium dinitrate and 1.4 grams of tetraamine platinum dinitrate for six minutes at room temperature. The monolith was then removed from the second aqueous solution, dried under controlled humidity drying and calcined again at 500° C. for one hour. The target values of lanthanum, cerium, palladium and platinum on Catalyst 12 were 1.4 wt %, 2.9 wt %, 0.088 wt % and 0.085 wt %, respectively.

Catalyst 13 was prepared using sequential impregnation as follows. A 99.6 wt % alpha-alumina monolith was placed under a vacuum for six minutes and then soaked in a first aqueous solution containing 103.2 grams of lanthanum trinitrate and 204.3 grams of cerium trinitrate in 1,100 ml of water for six minutes at room temperature. The monolith was removed from the first aqueous solution, dried under controlled humidity drying and then calcined at 500° C. for one hour. Next, the monolith was soaked in a second aqueous solution containing 1.97 grams of tetraamine palladium dinitrate and 1.4 grams of tetraamine platinum dinitrate in 400 ml of water for six minutes at room temperature. The monolith was then removed from the second aqueous solution, dried under controlled humidity drying and calcined again at 500° C. for one hour. Next, the monolith was soaked in a third aqueous solution containing 0.18 gram of rhodium trinitrate in 400 ml of water for six minutes at room temperature. The monolith was then removed from the third aqueous solution, dried under controlled humidity drying and calcined again at 500° C. for one hour. The target values of lanthanum, cerium, palladium, platinum, and rhodium on Catalyst 13 were 1.4 wt %, 2.7 wt %, 0.067 wt %, 0.067 wt %, and 0.016 wt %, respectively.

Catalyst 14 was prepared using sequential impregnation as follows. A 99.6 wt % alpha-alumina monolith was placed under a vacuum for six minutes and then soaked in a first aqueous solution containing 46.9 grams of lanthanum trinitrate in 500 ml of water for six minutes at room temperature. The monolith was removed from the first aqueous solution, dried under controlled humidity drying and then calcined at 500° C. for one hour. Next the monolith was soaked in a second aqueous solution containing 2.46 grams of tetraamine palladium dinitrate in 500 ml of water for six minutes at room temperature. The monolith was then removed from the second aqueous solution, dried under controlled humidity drying and calcined again at 500° C. for one hour. The target values of lanthanum and palladium on Catalyst 14 were 1.3 wt % and 0.079 wt %, respectively.

TABLE 1

| CATALYST | HOURS AGED | $T_{50}$, °C. $C_2H_4$ | $C_2H_6$ | $CH_4$ |
|---|---|---|---|---|
| 1 (Comparative) | 0 | 218 | 596 | 697 |
|  | 20 | 225 | 662 | 751 |
|  | 30 | 235 | 675 | 763 |
|  | 40 | 311 | 660 | 756 |
|  | 50 | 287 | 680 | 776 |
|  | 60 | 287 | 680 | 776 |
|  | 80 | 280 | 670 | 761 |
| 2 (Comparative) | 0 | 240 | 653 | 824 |
|  | 10 | 775 | 694 | 785 |
|  | 20 | 719 | 709 | 726 |
|  | 30 | 736 | 689 | 763 |
| 3 (Comparative) | 0 | 196 | 388 | 446 |
|  | 10 | 213 | 523 | 677 |
|  | 20 | 225 | 562 | 670 |
|  | 30 | 226 | 552 | 709 |
|  | 50 | 216 | 533 | 709 |
|  | 70 | 233 | 550 | 744 |
|  | 90 | 235 | 545 | 751 |
| 4 | 0 | 212 | 658 | 771 |
|  | 20 | 582 | 680 | 795 |
|  | 40 | 689 | 766 | 776 |
| 5 | 0 | 235 | 659 | 734 |
|  | 20 | 333 | 687 | 766 |
|  | 40 | 339 | 687 | 795 |
| 6 | 0 | 186 | 488 | 736 |
|  | 20 | 262 | 653 | 750 |
|  | 40 | 252 | 611 | 722 |
|  | 60 | 258 | 616 | 724 |
|  | 70 | 233 | 631 | 732 |
| 7 | 0 | 181 | 596 | 707 |
|  | 2* | 245 | 673 | 751 |
|  | 4** | 248 | 663 | 751 |
|  | 20 | 245 | 633 | 734 |
|  | 40 | 253 | 641 | 749 |
|  | 42* | 277 | 751 | 773 |
|  | 44** | 218 | 592 | 675 |
|  | 60 | 285 | 668 | 776 |

TABLE 1-continued

| CATALYST | HOURS AGED | $T_{50}$, °C. $C_2H_4$ | $C_2H_6$ | $CH_4$ |
|---|---|---|---|---|
|  | 80 | 277 | 653 | 766 |
|  | 82 | 277 | 645 | 761 |
|  | 84* | 346 | 717 | 820 |
|  | 86* | 338 | 719 | 820 |
| 8 | 0 | 186 | 456 | 619 |
|  | 20 | 299 | 655 | 790 |
|  | 40 | 355 | 628 | 756 |
|  | 45* | 530 | 702 | 815 |
| 9 | 0 | 181 | 550 | 709 |
|  | 20 | 341 | 638 | 788 |
|  | 40 | 452 | 677 | 820 |
|  | 45* | 778 | 732 | 835 |
| 10 | 0 | 491 | 611 | 734 |
|  | 20 | 586 | 658 | 754 |
|  | 22 | 732 | 655 | 744 |
| 11 | 0 | 215 | 466 | 732 |
|  | 20 | 682 | 751 | 791 |
| 12 | 0 | 582 | 569 | 700 |
|  | 20 | 174 | 601 | 719 |
|  | 40 | 257 | 621 | 712 |
|  | 60 | 238 | 673 | 761 |
|  | 80 | 230 | 576 | 687 |
| 13 | 0 | 270 | 600 | 722 |
|  | 20 | 660 | 690 | 793 |
| 14 | 0 | 589 | 525 | 616 |
|  | 20 | 341 | 506 | 599 |
|  | 40 | 323 | 458 | 596 |
|  | 80 | 314 | 508 | 604 |

*Tested at GHSV of 80,000 hr$^{-1}$
**Tested at GHSV of 40,000 hr$^{-1}$ with no additional aging.

EXAMPLE 2

An exhaust gas catalyst according to the invention was prepared on a 100 cpi, porous, alpha-alumina monolith (99.6 wt % alpha-alumina, 0.33 cc/g pore volume, surface area of 0.91 m$^2$/g). The monolith was impregnated with a solution containing palladium and platinum tetraamine dinitrate salts. The impregnation, controlled humidity drying and heating of the monolith were carried out in the same manner as with Catalysts 4–14 in Example 1. The monolith had a diameter of 4½" (circular shape) and a length of 4¾". The total volume of the monolith was 76 cubic inches. The composition of this exhaust gas catalyst is shown in Table 2 below.

The finished exhaust gas catalyst was wrapped with a high temperature stable, INTERAM alumina fibermat sheet and then canned to provide an automotive exhaust catalytic muffler, which was installed in an eight-cylinder (V-8), 5.7 liter (350 cubic inch) Chevrolet engine.

After catalyst break-in and some test evaluations, the initial performance of the exhaust gas catalyst in the muffler was measured at 500° C., about 80,000 GHSV and ±0.5 A/F frequency sweep at one Hertz frequency from 14.2 to 15.4 A/F. The initial hydrocarbon, CO and NO$_x$ conversion rates at stoichiometric conditions (A/F equal to 14.6) are shown in Table 3 below.

The exhaust gas catalyst was then placed in the exhaust of an eight-cylinder (V-8), 7.5 liter (460 cubic inch) Ford engine to test its high temperature stability. The inlet temperature of the catalyst was set at 1100° C. for 40 minutes by running the engine on the rich side and injecting additional air. Then a spark plug was disconnected from the engine, allowing extra unburned fuel and air to reach the catalyst to simulate misfire of a cylinder, causing the exhaust gas temperature (at inlet to converter) to reach about 1200° C. The temperature of the exhaust gas catalyst was maintained at about 1200° C. for about one minute. The exhaust gas catalyst was then examined. It displayed no cracks or structural damage on the cylindrical faces, or meltdown areas. A circumferential crack in the mid-section was observed at the location of an extrusion defect/crack. The hydrocarbon conversion, CO conversion and NO$_x$ conversion levels of the catalyst were then measured again in the 5.7 liter Chevrolet engine. The hydrocarbon conversion, CO conversion, and NO$_x$ conversion figures for this exhaust gas catalyst after the high temperature test are shown in Table 3.

For purposes of comparison, a commercially available Honda Accord catalytic converter was tested in the same manner in the 5.7 Chevrolet and 7.5 liter Ford engines. The Honda Accord catalytic converter was made up of two pieces of catalyst, the first 3½" in diameter and 4" in length, and the second 3½" in diameter and 4¼" in length. The total volume of both pieces was 81 cubic inches and the open cell density was 300 cpi. The approximate composition of the Honda Accord catalyst is shown in Table 2.

The conditions of the Chevrolet engine were adjusted to give a temperature of 500° C. and a GHSV of about 80,000. After initial break-in and other test evaluations, the performance of the Honda Accord catalyst was obtained. The percent conversions of hydrocarbons, CO and NO$_x$, at 14.6 A/F conditions are shown in Table 3. After heating the pieces of Honda Accord catalyst at 1100° C. for 40 minutes followed by the additional heating for one minute at about 1200° C., both pieces of Honda Accord catalyst showed areas where the monolith structure was missing due to melt-down in the center positions of the outlet of the first piece and the inlet and outlet of the second piece.

After the high temperature heating of the Honda Accord catalyst, the conversions of hydrocarbons, CO and NO$_x$ dropped greatly, as shown in Table 3. This is in contrast to the relatively small drop in hydrocarbon and CO conversions and the unexpected increase in NO$_x$ conversion achieved with the exhaust gas catalyst of the invention after high-temperature aging.

TABLE 2

Catalyst Composition

| Catalyst | % Pd | % Pt | % Rh |
|---|---|---|---|
| Honda Accord #1 | 0.03 | 0.08 | 0.015 |
| Honda Accord #2 | 0.03 | 0.06 | 0.012 |
| Exhaust Gas Catalyst of the Invention | 0.03 | 0.03 | 0.000 |

TABLE 3

Catalyst Performance

|  | Initial | | | After High-Temp. Test | | |
|---|---|---|---|---|---|---|
|  | % HC | % CO | % NO$_x$ | % HC | % CO | % NO$_x$ |
| Honda Accord (#1 + #2)[a] (In Series) | 84 | 80 | 48 | 67 | 50 | 10 |
| Exhaust Gas Catalyst of the Invention | 72 | 50 | 12 | 62 | 57 | 40 |

[a]This catalyst had operated for a total of 100 hours under cyclical temperature operation (between 500° C. and 800° C. every 4 hours) to accelerate break-in and initial aging.

We claim:

1. An exhaust gas catalyst for the combustion of carbon monoxide and hydrocarbons and the reduction of nitrogen oxides, comprising a porous, substantially pure alpha-alumina carrier which is at least about 95 percent by weight alpha-alumina, has a porosity of about 0.2 to about 0.6 cubic centimeter per gram, has a surface area of about 0.2 to about 10 square meters per gram, and has an average pore size of about 0.1 to about 100 microns, and an effective amount of a noble metal impregnated in the carrier and selected from the group consisting of (a) platinum or palladium in combination with a promoter and (b) mixtures of platinum and palladium in combination with a promoter, and wherein the said promoter is selected from the group consisting of cerium, molybdenum, chromium, titanium, lanthanum, niobium, zirconium, and the rare earth metals.

2. The catalyst of claim 1 further comprising rhodium.

3. The catalyst of claim 1, wherein the amount of noble metal is from about 0.01 percent to about 2 percent by weight of the catalyst.

4. The catalyst of claim 1, wherein the noble metal is a mixture of platinum and palladium present in a weight ratio in the range of 0.01:1 to 100:1.

5. The catalyst of claim 1, wherein the noble metal is platinum present in an amount of from about 0.02 to about 1.0 percent by weight of the catalyst.

6. The catalyst of claim 1, wherein the alpha-alumina carrier has a monolithic structure.

7. A method of preparing an exhaust gas catalyst for the combustion of carbon monoxide and hydrocarbons and the reduction of nitrogen oxides, comprising:

a) impregnating a porous, substantially pure alpha-alumina carrier which is at least about 95 percent by weight alpha-alumina, having a porosity of about 0.2 to about 0.6 cubic centimeter per gram, a surface area of about 0.2 to about 10 square meters per gram, and an average pore size of about 0.1 to about 100 microns, with a noble metal selected from the group consisting of platinum, palladium, and mixtures thereof in combination with a promoter selected from the group consisting of cerium, molybdenum, chromium, titanium, lanthanum, niobium, zirconium, and the rare earth metals by contacting the carrier with a solution containing a solvent, a compound of the noble metal and a compound of the promoter;

b) drying the impregnated carrier at a rate of less than about 1 gram of solvent per gram of carrier per hour until at least about 90 percent of the solvent is removed from the carrier; and c) heating the dried carrier.

8. The method of claim 7, wherein the compound of the noble metal is present in the solution in an amount of about 0.001 to about 0.03 grams per milliliter of solution.

9. The method of claim 7, wherein the solvent is water.

10. The method of claim 9, wherein the compound of the noble metal is an aminonitrate salt.

11. The method of claim 7, wherein the solvent is an organic compound.

12. The method of claim 11, wherein the organic compound is selected from the group consisting of benzene, toluene, ethylbenzene, biphenyl, xylene, n-octane, isooctane, cyclopentane, cyclohexane, methylcyclohexane, tetrahydrofuran, diglyme, ethyl ether, acetonitrile and mixtures thereof.

13. The method of claim 12, wherein the compound of the noble metal is an acetylacetonate salt.

14. The method of claim 7, wherein heating is performed at a temperature of from about 100° C. to about 900° C.

15. The method of claim 7, wherein drying and heating are performed at the same time.

16. An exhaust gas catalyst for the combustion of carbon monoxide and hydrocarbons and the reduction of nitrogen oxides prepared by the method of claim 7.

* * * * *